(12) United States Patent
Xu et al.

(10) Patent No.: US 10,326,974 B2
(45) Date of Patent: Jun. 18, 2019

(54) NAKED-EYE 3D DISPLAY METHOD AND SYSTEM THEREOF

(71) Applicant: SHENZHEN SKYWORTH-RGB ELECTRONIC CO., LTD., Shenzhen (CN)

(72) Inventors: Yaoling Xu, Shenzhen (CN); Zhilong Hou, Shenzhen (CN)

(73) Assignee: Shenzhen Skyworth-RGB Electronic Co., Ltd., Shenzhen (CN)

( * ) Notice: Subject to any disclaimer, the term of this patent is extended or adjusted under 35 U.S.C. 154(b) by 253 days.

(21) Appl. No.: 15/507,494

(22) PCT Filed: Feb. 1, 2016

(86) PCT No.: PCT/CN2016/073084
§ 371 (c)(1),
(2) Date: Feb. 28, 2017

(87) PCT Pub. No.: WO2017/124586
PCT Pub. Date: Jul. 27, 2017

(65) Prior Publication Data
US 2018/0109772 A1  Apr. 19, 2018

(30) Foreign Application Priority Data
Jan. 20, 2016  (CN) .......................... 2016 1 0036403

(51) Int. Cl.
*H04N 13/111* (2018.01)
*H04L 13/00* (2006.01)
(Continued)

(52) U.S. Cl.
CPC ............ *H04N 13/111* (2018.05); *H04L 13/00* (2013.01); *H04N 13/128* (2018.05); *H04N 13/15* (2018.05);
(Continued)

(58) Field of Classification Search
CPC .. H04N 13/111–13/117; H04N 19/597; H04N 13/302
See application file for complete search history.

(56) References Cited

U.S. PATENT DOCUMENTS 6,108,005 A * 8/2000 Starks ................ G02B 27/2207
345/419
2012/0098942 A1 4/2012 Meyer
(Continued)

FOREIGN PATENT DOCUMENTS

| CN | 102196294 A | 9/2011 |
| CN | 102752616 A | 10/2012 |

(Continued)

OTHER PUBLICATIONS

The World Intellectual Property Organization (WIPO). International Search Report for PCT/CN2016/073084 dated Oct. 8, 2016 5 pages.

*Primary Examiner* — Robert J Hance
(74) *Attorney, Agent, or Firm* — Anova Law Group, PLLC

(57) ABSTRACT

The present invention provides a naked-eye 3D display method and system thereof, decoding a 3D signal and obtaining an original 3D video signal; through executing signal separation, image improvement, classifying and frame interpolation to the original 3D video signal, before obtaining the according L image and R image; obtaining the depth information of the objects in the L image and R image and estimating the depth information of each pixel, and forming a corresponding figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and (Continued)

the images with a plurality of R viewpoints; executing frame interpolation, frequency doubling and image calibration to the composite images, before transmitting to the naked-eye 3D displayer, to achieve the naked-eye 3D display; it has achieved the viewpoints conversion for naked-eye 3D effectively, taking up less resources, having a high definition 3D display, which is stable and fluency, it has a low cost and a wide application.

10 Claims, 5 Drawing Sheets

(51) Int. Cl.
- *H04N 13/128* (2018.01)
- *H04N 13/15* (2018.01)
- *H04N 13/302* (2018.01)
- *H04N 19/597* (2014.01)
- *H04N 13/161* (2018.01)

(52) U.S. Cl.
CPC ......... *H04N 13/161* (2018.05); *H04N 13/302* (2018.05); *H04N 19/597* (2014.11)

(56) References Cited

U.S. PATENT DOCUMENTS

| | | | |
|---|---|---|---|
| 2012/0139902 A1* | 6/2012 | Fujisawa | H04N 13/111 345/419 |
| 2012/0163700 A1* | 6/2012 | Ikeda | G06T 15/20 382/154 |
| 2012/0321171 A1* | 12/2012 | Ito | H04N 13/128 382/154 |
| 2013/0187910 A1* | 7/2013 | Raymond | G09G 5/14 345/419 |
| 2015/0124062 A1* | 5/2015 | Didyk | H04N 13/122 348/51 |
| 2015/0296204 A1 | 10/2015 | Kim et al. | |

FOREIGN PATENT DOCUMENTS

| | | |
|---|---|---|
| CN | 102802004 A | 11/2012 |
| CN | 102932657 A | 2/2013 |
| CN | 103260044 A | 8/2013 |
| CN | 102215405 B | 10/2013 |
| KR | 20050100895 A | 10/2005 |

* cited by examiner

NAKED-EYE 3D DISPLAY METHOD AND SYSTEM THEREOF

CROSS-REFERENCES TO RELATED APPLICATIONS

This application is a national stage application of PCT Patent Application No. PCT/CN2016/073084, filed on Feb. 1, 2016, which claims priority to Chinese Patent Application No. 201610036403.0, filed on Jan. 20, 2016, the content of all of which is incorporated herein by reference.

FIELD OF THE INVENTION

The present invention relates to the field of naked-eye 3D display technology, and, more particularly, to a naked-eye 3D display method and system thereof.

BACKGROUND

Generally, a 3D (three-dimensional) image is composed by two images, which may realize a 3D effect in a human sight according to a certain view angle, forming a three-dimensional sense, making the image look like true in the human sight. Based on parallax information contained in two video series, an image corresponding to a new view angle may be generated, which is a key for a naked-eye 3D TV.

A naked-eye 3D display technology is able to make a left eye and a right eye see two different images with parallax from a display screen without an aim by any tools, before reflecting them into a human brain, and achieving a view effect of three-dimension. Since a viewer of a naked-eye 3D TV may experience the 3D effect without wearing a pair of glasses, which matches a market demand of the 3D display, thus, it owns a relatively large market and business opportunity. In a prior art, a 3D signal output from a 3D signal source device usually owns two viewpoints of left and right (L/R) only, while a naked-eye 3D TV requires more viewpoints for a large range of 3D experiences, thus, converting 2 viewpoints into a plurality of viewpoints is required, while a switch between viewpoints may take up extra TV resources, reduce a definition for viewing, and so on.

Therefore, the current technology needs to be improved and developed.

BRIEF SUMMARY OF THE DISCLOSURE

According to the above described defects, the purpose of the present invention is providing a naked-eye 3D display method and system thereof, in order to solve the problem in the prior art that a 3D viewpoint conversion takes up extra TV resources, and reduces the definition.

In order to achieve the above mentioned goals, the technical solution of the present invention to solve the technical problems is as follows:

A naked-eye 3D display method, wherein, it includes a plurality of following steps:

S1: decoding a 3D signal and obtaining an original 3D video signal;

S2: executing a plurality of operations to the original 3D video signal, including: signal separating, image improving, classifying and frame interpolating, before obtaining a corresponding left (L) image and right (R) image;

S3: obtaining a depth information of an object in the L image and R image, and estimating a depth information of each pixel, before forming a corresponding figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the mages with a plurality of R viewpoints;

S4: executing a frame interpolation, frequency doubling and image calibration for the composite image, before transmitting to a naked-eye 3D displayer, to achieve a naked-eye 3D display.

The naked-eye 3D display method, wherein, the step S2 includes specifically:

S21, executing a signal separation to the original 3D video signal, before obtaining a corresponding L image signal and a R image signal; executing a plurality of processes including image improving, classifying and frame interpolating to the L image signal and R image signal, before obtaining a corresponding L images sequence and a R images sequence; executing a format interweavement to the L images sequence and R images sequence, before obtaining a corresponding image signal in an LVDS signal format.

The naked-eye 3D display method, wherein, the step S21 includes specifically:

S211, executing a signal separation to the original 3D video signal, before converting an original 3D image signal into an L image signal, a R image signal, and an L/R synchronizing signal corresponding to the L image signal and the R image signal;

S212, converting a color space of the L image and R image into a YUV color space, executing an image improvement to the L images and R images in the YUV color space through a luminance partition scaling and a hierarchical interpolation, before converting into an L image and a R image with pixels composing an M*N matrix; wherein, each of the M and N is a positive integer;

S213, classifying the L images and R images with the pixels of M*N, under a control of the L/R synchronizing signal, before caching successively the L images together into an L image set, and caching successively the R images together into a R image set; executing the frame interpolation to the L image set and R image set respectively, before forming an L image set with a frame frequency f1 and a R image set with a frame frequency f1; outputting the images in the L image set and R image set successively, and outputting an according R identification signal and L identification signal; wherein, f1 is a positive integer;

S214, executing a RGB image conversion to the L images and R images, converting the L image and R image in the YUV color space into an L image and R image in a RGB color space respectively;

S215, arranging the pixels of the L images and R images in the RGB color space according to a law, interweaving each component of R, G, B in each pixel into an LVDS signal format according to a rule, and inserting an L identification into four pixels transmitted earliest in the L image, inserting a R identification into four pixels transmitted earliest in the R image, before outputting alternatively at a rate of frame frequency 2f1.

The naked-eye 3D display method, wherein, the step S212 includes specifically:

S2121, converting a color space of the L image and R image into a YUV color space, and converting the pixels of the L image and R image into a plurality of pixels in YUV 4:2:2;

S2122, analyzing and classifying a luminance Y of the image signal in the YUV color space, before dividing into a low luminance area, a mid luminance area and a high luminance area according to a luminance value; the luminance value of the low luminance area is smaller than a first threshold, the luminance value of the mid luminance area is between the first threshold and a second threshold, the luminance value of the high luminance area is larger than the second threshold; while the first threshold is smaller than the second threshold;

S2123, adopting a method of luminance partition scaling to improve a contrast, executing a luminance compression to the images in the low luminance area, executing a luminance enhancement to the images in the mid luminance area, while keeping the luminance in the high luminance area unchanged;

S2124, improving a resolution through a method of hierarchical interpolation, adopting a plurality of different interpolation algorithm for different luminance areas, before converting the resolution of image into a fixed resolution, while the pixels of the L image and R image after conversion compose an M*N matrix.

The naked-eye 3D display method, wherein, the step S3 includes specifically:

S31, executing an unweaving and image separating process to the image signals in the LVDS signal format, before separating into an L images sequence and a R images sequence; obtaining a depth information of an object in the L images sequence and R images sequence, and estimating the depth information of each pixel, before forming a continuous and smooth figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the images with a plurality of R viewpoints; obtaining a corresponding image signal in a VBO signal format after interweaving the format of the composite image.

The naked-eye display method, wherein, the step S31 includes specifically:

S311, converting the image signal in the LVDS signal format into a RGB image signal, before separating the L image and R image;

S312, obtaining a similar object in the L image and R image, based on a horizontal displacement of the similar object in the L image and R image, calculating the parallax of the similar object in the L image and R image; executing a procession according to an information of color, texture and light/shadow of the object in the L image and R image, before estimating the depth information of each pixel, and a continuous and smooth figure of depth is then formed;

S313, adopting a method of interpolating the viewpoints or extending the viewpoints, estimating an image with a plurality of L viewpoints according to the L image and the corresponding figure of depth, and estimating an image with a plurality of R viewpoints according to the R image and the corresponding figure of depth;

S314, forming a composite image including a plurality of viewpoints information after a procession of interweaving the images with a plurality of L viewpoints and the images with a plurality of R viewpoints, according to an arrangement condition of the physicals pixels of the naked-eye 3D displayer;

S315, executing a format interweavement to the composite image comprising a plurality of viewpoint information, and interweaving into a corresponding image signal in the VBO signal format, before outputting at a rate of frequency f2, the f2 is a positive integer.

The naked-eye display method, wherein, the step S4 includes:

S41, unweaving the image signals in the VBO signal format, before converting into a plurality of composite images in the RGB signal format;

S42, executing a process of frame interpolating and frequency doubling to the composite image, converting a frame of image into T frames of the same image after repeating, and obtaining a composite image with a frequency of Tf2, wherein, the T is larger than 1;

S43, executing an image calibration to the composite image, according to an electric character and a requirement of a display effect of the naked-eye 3D displayer;

S44, interweaving the calibrated composite image into an according figure signal in the VBO signal format, and transmitting to the naked-eye 3D displayer at a rate of frequency Tf2, to achieve a naked-eye 3D display.

A naked-eye 3D display system, wherein, it comprises:

a decoding module, applied to decoding a 3D signal and obtaining an original 3D video signal;

a first 3D video processing module, applied to executing a plurality of operations to the original 3D video signal, including: signal separating, image improving, classifying and frame interpolating, before obtaining a corresponding L image and R image;

a second 3D video processing module, applied to obtaining a depth information of an object in the L image and R image, and estimating a depth information of each pixel, before forming a corresponding figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the mages with a plurality of R viewpoints;

a third 3D video processing module, applied to executing a frame interpolation, frequency doubling and image calibration for the composite image, before transmitting to a naked-eye 3D displayer, to achieve a naked-eye 3D display.

The naked-eye 3D display system, wherein, the first 3D video processing module comprises:

a first 3D video processing unit, applied to executing a signal separation to the original 3D video signal, before obtaining a corresponding L image signal and a R image signal; executing a plurality of processes including image improving, classifying and frame interpolating to the L image signal and R image signal, before obtaining a corresponding L images sequence and a R images sequence; executing a format interweavement to the L images sequence and R images sequence, before obtaining a corresponding image signal in an LVDS signal format.

The naked-eye 3D display system, wherein, the first 3D video processing unit comprises:

a signal separating unit, applied to executing a signal separation to the original 3D video signal, before converting an original 3D image signal into an L image signal, a R image signal, and an L/R synchronizing signal corresponding to the L image signal and the R image signal;

a color converting and image improving unit, applied to converting a color space of the L image and R image into a YUV color space, executing an image improvement to the L images and R images in the YUV color space through a luminance partition scaling and a hierarchical interpolation, before converting into an L image and a R image with pixels composing an M*N matrix; wherein, each of the M and N is a positive integer;

a classifying and frame interpolating unit, applied to classifying the L images and R images with the pixels of M*N, under a control of the L/R synchronizing signal, before caching successively the L images together into an L image set, and caching successively the R images together into a R image set; executing the frame interpolation to the L image set and R image set respectively, before forming an L image set with a frame frequency f1 and a R image set with a frame frequency f1; outputting the images in the L image set and R image set successively, and outputting an according R identification signal and L identification signal; wherein, f1 is a positive integer;

a RGB image conversion unit, applied to executing a RGB image conversion to the L images and R images, converting the L image and R image in the YUV color space into an L image and R image in a RGB color space respectively;

a first interweaving and outputting unit, applied to arranging the pixels of the L images and R images in the RGB color space according to a law, interweaving a component of R, G, B in each pixel into an LVDS signal format according to a rule, and inserting an L identification into four pixels transmitted earliest in the L image, inserting a R identification into four pixels transmitted earliest in the R image, before outputting alternatively at a rate of the frame frequency of 2f1.

The naked-eye 3D display system, wherein, the color conversion and image improving unit comprises:

a color conversion unit, applied to converting a color space of the L image and R image into a YUV color space, and converting the pixels of the L image and R image into a plurality of pixels of the YUV 4:2:2;

a luminance classification unit, applied to analyzing and classifying a luminance Y of the image signal in the YUV color space, before dividing into a low luminance area, a mid luminance area and a high luminance area according to a luminance value; the luminance value of the low luminance area is smaller than a first threshold, the luminance value of the mid luminance area is between the first threshold and a second threshold, the luminance value of the high luminance area is larger than the second threshold; while the first threshold is smaller than the second threshold;

a partition scaling unit, applied to adopting a method of luminance partition scaling to improve a contrast, executing a luminance compression to the images in the low luminance area, executing a luminance enhancement to the images in the mid luminance area, while keeping the luminance in the high luminance area unchanged;

a hierarchical interpolating unit, applied to improving a resolution through a method of hierarchical interpolation, adopting a plurality of different interpolation algorithm for different luminance areas, before converting a resolution of image into a fixed resolution, while the pixels of the L image and R image after conversion compose an M*N matrix.

The naked-eye 3D display system, wherein, the second 3D video processing module includes:

a second 3D video processing unit, applied to unweaving and image separating the image signals in the LVDS signal format, before separating into an L images sequence and a R images sequence; obtaining a depth information of an object in the L images sequence and R images sequence, estimating the depth information of each pixel, before forming a continuous and smooth figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the images with a plurality of R viewpoints; obtaining a corresponding image signal in a VBO signal format after interweaving the format of the composite image.

The naked-eye 3D display system, wherein, the second 3D video processing unit comprises:

an unweaving and image separating unit, applied to converting the image signal in the LVDS signal format into a RGB image signal, before separating the L image and R image;

a figure of depth generating unit, applied to obtaining a similar object in the L image and R image, based on a horizontal displacement of the similar object in the L image and R image, calculating the parallax of the similar object in the L image and R image; executing a procession according to a color, texture and light/shadow information of the objects in the L image and R image, before estimating the depth information of each pixel, and a continuous and smooth figure of depth is then formed;

a multi-viewpoints generation unit, applied to adopting a method of interpolating the viewpoints or extending the viewpoints, estimating an image with a plurality of L viewpoints according to the L image and the corresponding figure of depth, and estimating an image with a plurality of R viewpoints according to the R image and the corresponding figure of depth;

a viewpoint integration unit, applied to forming a composite image including a plurality of viewpoints information after a procession of interweaving the images with a plurality of L viewpoints and the images with a plurality of R viewpoints, according to an arrangement condition of the physicals pixels of the naked-eye 3D displayer;

a second interweaving and outputting unit, applied to executing a format interweavement to the composite image comprising a plurality of viewpoints information, and interweaving into a corresponding image signal in the VBO signal format, before outputting at a rate of frequency f2, the f2 is a positive integer.

The naked-eye 3D display system, wherein, the third 3D video processing module comprises:

an unweaving unit, applied to unweaving the image signals in the VBO signal format, before converting the image signal in the VBO signal format into a composite image in the RGB signal format;

a frame interpolating and frequency doubling unit, applied to executing a process of frame interpolating and frequency doubling to the composite image, converting a frame of image into T frames of the same image after repeating, and obtaining a composite image with a frequency of Tf2, wherein, the T is larger than 1;

an image calibration unit, applied to executing an image calibration to the composite image, according to an electric character and a requirement of a display effect of the naked-eye 3D displayer;

an interweaving and outputting and display unit, applied to interweaving the calibrated composite image into an according figure signal in the VBO signal format, and transmitting to the naked-eye 3D displayer at a rate of frequency Tf2, to achieve a naked-eye 3D display.

The present invention provides a naked-eye 3D display method and system thereof, which has effectively solved the problem in the prior art that a current 3D viewpoint conversion takes up extra TV resources, but reduces the definition, and obtained the original 3D video signal through decoding the 3D signal; executing a plurality of processes including signal separation, image improvement, classifying and frame interpolation to the original 3D video signal, before obtaining the according L image and R image; obtaining the depth information of the objects in the L image and R image and estimating the depth information of each pixel, and forming a corresponding figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the images with a plurality of R viewpoints; executing a plurality of processes including frame interpolation, frequency doubling and image calibration, to the composite images, before transmitting to the naked-eye 3D displayer, to achieve the naked-eye 3D display; it has achieved the viewpoints conversion for naked-eye 3D effectively, while taking up less resources, having a high definition 3D display, which is stable and fluency, and it has a low cost, a wide application, thus has brought a great convenience.

DETAILED DESCRIPTION OF EMBODIMENTS

The present invention provides a naked-eye 3D display method and system thereof, in order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
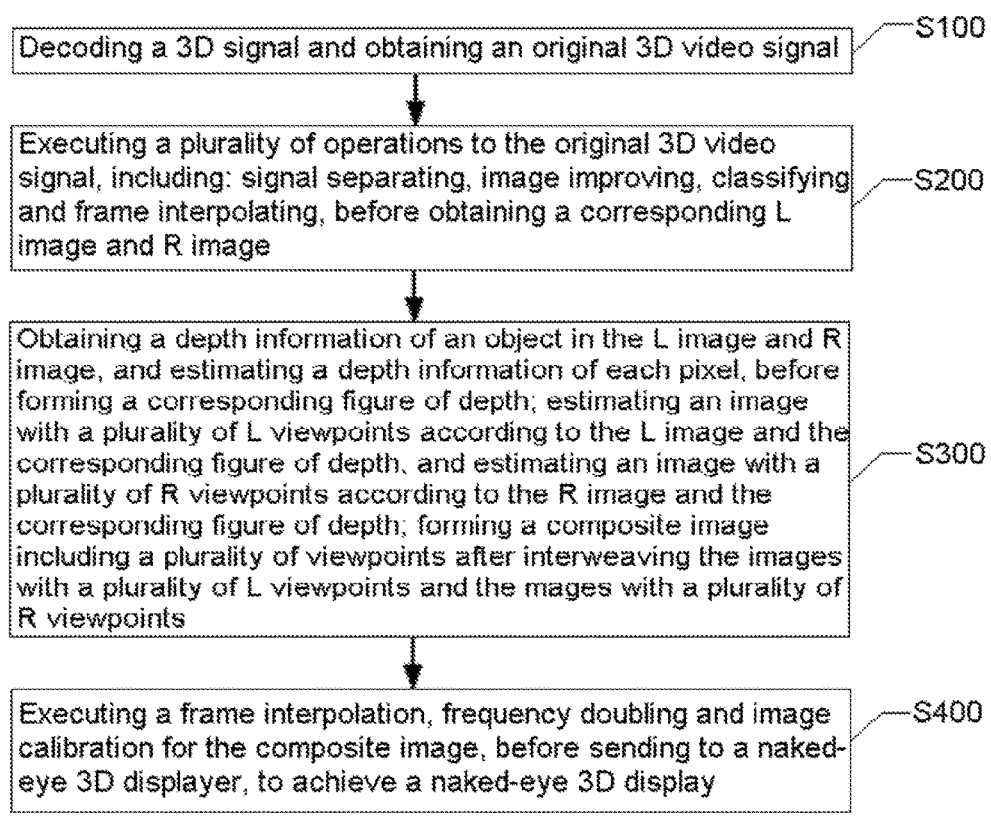
FIG. 1 illustrates a flowchart of a first embodiment on the naked-eye 3D display method as provided in the present invention.

Referencing to FIG. 1, which is a flowchart of a first embodiment on the naked-eye 3D display method as provided in the present invention, as shown in the FIG., the method includes a plurality of following steps:

step S100, decoding a 3D signal and obtaining an original 3D video signal;

step S200, executing a plurality of operations to the original 3D video signal, including: signal separating, image improving, classifying and frame interpolating, before obtaining a corresponding L image and R image;

step S300, obtaining a depth information of an object in the L image and R image, and estimating a depth information of each pixel, before forming a corresponding figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the mages with a plurality of R viewpoints;

step S400, executing a frame interpolation, frequency doubling and image calibration for the composite image, before transmitting to a naked-eye 3D displayer, to achieve a naked-eye 3D display.

Detailed descriptions on the above mentioned steps are stated below, referencing to some embodiments.

In the step S100, decoding a 3D signal and obtaining an original 3D video signal. Specifically, the naked-eye 3D may be applied to a plurality of terminals, while each has a displayer, including a TV, a cell phone, a tablet, and else. In present technologies, a naked-eye 3D TV is still the most widely applied, thus a description on the present invention is stated below, taking the naked-eye 3D TV as an example. The 3D signal is a 3D TV signal; an interface circuit of the naked-eye 3D TV receives the 3D TV signal output from an external 3D signal source device, before executing a plurality of processes to the 3D TV signal, including a magnitude limitation, a format recognition and else, followed by outputting the processed 3D TV signal to a signal decoding part; the decoding part decodes the 3D TV signal and obtains the original 3D video signal.

Figure 2:
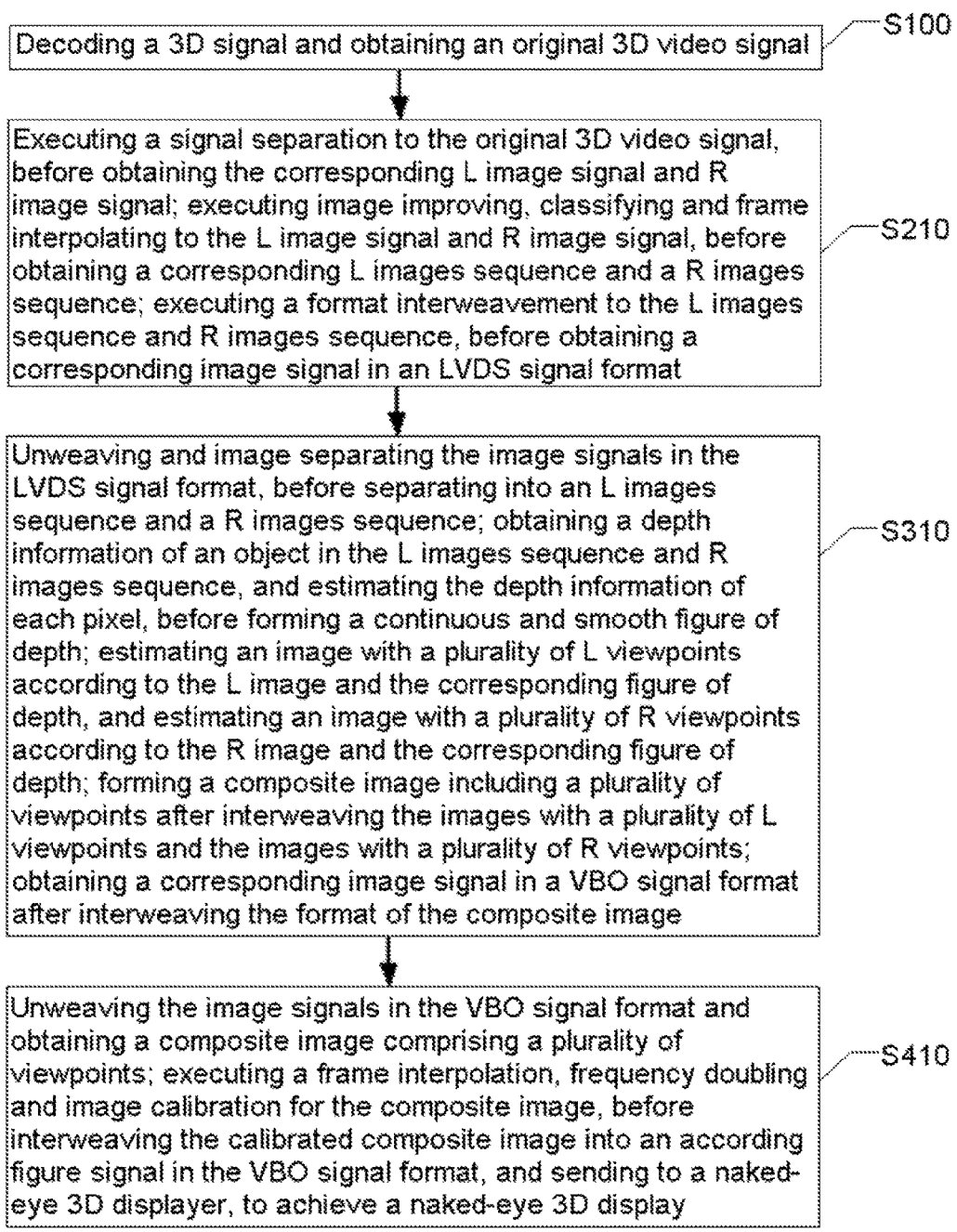
FIG. 2 illustrates a flowchart on a method of a second embodiment on the naked-eye 3D display method as provided in the present invention.

In the step S200, executing a plurality of operations to the original 3D video signal, including: signal separating, image improving, classifying and frame interpolating, before obtaining a corresponding L image and R image. Specifically, referencing to FIG. 1 and FIG. 2 together, FIG. 2 is a flowchart on a method of a second embodiment on the naked-eye 3D display method as provided in the present invention, as shown in FIG. 2, the step S200 includes: S210, executing a signal separation to the original 3D video signal, before obtaining a corresponding L image signal and R image signal; executing a plurality of processes including image improving, classifying and frame interpolating to the L image signal and R image signal, before obtaining a corresponding L images sequence and a R images sequence; executing a format interweavement to the L images sequence and R images sequence, before obtaining a corresponding image signal in an LVDS (Low Voltage Differential Signaling) signal format.

Specifically, executing a signal separation to the original 3D video signal, before obtaining an original L (left eye) image signal and R (right eye) image signal and an L/R synchronizing signal; executing a color conversion to the L and R image signals, and adopting a luminance partition scaling and a hierarchical interpolation to make an image improvement, before converting into an L image and a R image with pixels composing a matrix of M*N; followed by a classification and an image interpolation to the L and R images with pixels of M*N, and converting into an L image sequence with a frequency of f1 and a R image sequence with a frequency of f1; executing a RGB image conversion to the L images and R images in the image sequences, making the pixels in the images composed by R, G, B, followed by a further format interweaving to the L image sequence and R image sequence, and interweaving the L image and an L identification thereof into an LVDS signal format, similarly, interweaving the R image and a R identification thereof into an LVDS signal format, output alternatively at a rate of frame frequency 2f1. Wherein, each of the M, N and f1 is a positive integer, whose specific value may be set. Wherein, the L image represents a left image, the R image represents a right image, and it is a commonly used term in a field of 3D display technology, on the L image, R image and an L/R identification.

Preferably, the step S210 includes specifically:

S211, executing a signal separation to the original 3D video signal, before converting an original 3D image signal into an L image signal, a R image signal, and an L/R synchronizing signal corresponding to the L image signal and the R image signal;

S212, converting a color space of the L image and R image into a YUV color space, executing an image improvement to the L images and R images in the YUV color space through a luminance partition scaling and a hierarchical interpolation, before converting into an L image and a R image with pixels composing an M*N matrix; wherein, each of the M and N is a positive integer;

S213, classifying the L images and R images with the pixels of M*N, under a control of the L/R synchronizing signal, before caching successively the L images together into an L image set, and caching successively the R images together into a R image set; executing the frame interpolation to the L image set and R image set respectively, before forming an L image set with a frame frequency f1 and a R image set with a frame frequency f1; outputting the images in the L image set and R image set successively, and outputting an according R identification signal and L identification signal; wherein, f1 is a positive integer;

S214, executing a RGB image conversion to the L images and R images, converting the L image and R image in the YUV color space into an L image and R image in a RGB color space respectively;

S215, arranging the pixels of the L images and R images in the RGB color space according to a law, interweaving each component of R, G, B in each pixel into an LVDS signal format according to a rule, and inserting an L identification into four pixels transmitted earliest in the L image, inserting a R identification into four pixels transmitted earliest in the R image, before outputting alternatively at a rate of frame frequency 2f1.

Figure 3:
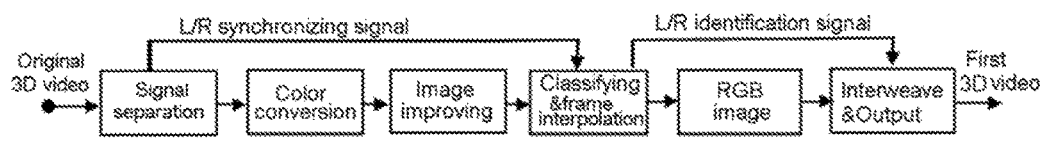
FIG. 3 illustrates a flowchart on a method of a step S210 in the second embodiment on the naked-eye 3D display method as provided in the present invention.

Referencing to FIG. 3, which is a flowchart on a method of a step S210 in the second embodiment on the naked-eye 3D display method as provided in the present invention, in a real implementation, after receiving the original 3D video signal, executing a signal separation to the original 3D video signal, before converting the original 3D image signal into the L image signal and R image signal, and the L/R synchronizing signal corresponding to the L image signal and R image signal.

Followed by the color conversion, converting a color space of the L image and R image into a YUV (a color encoding method, which is an existing technical term) color space, that is, converting a pixel P in the L image and R image into a pixel with a YUV 4:2:2, in order to save a plurality of resources for a following image procession, including a bandwidth and else, as well as improving a procession efficiency. Executing an image improvement for the L images and R images in the YUV color space through a method of luminance partition scaling and hierarchical interpolation, before converting into an L image and a R image with pixels composing an M*N matrix; wherein, each of the M and N is a positive integer.

Further, under a control of the L/R synchronizing signal, classifying the L image and R image, caching successively the L images together into an L image set, and caching successively the R images together into a R image set; executing the frame interpolation to the L image set and R image set respectively, before forming an L image set with a frame frequency f1 and a R image set with a frame frequency f1. Followed by outputting the images in the L image set and R image set successively, and outputting an according R identification signal and L identification signal; wherein, f1 is a frequency value, which is a positive integer;

Followed by executing a RGB image conversion to the L images and R images, converting the images in the YUV color space into an image in a RGB color space, each pixel of a RGB image is composed by R, G, B.

Then executing a operation of interweaving and outputting, arranging the pixels in the L images and R images according to a law, and interweaving each component of R, G, B in the pixels into an LVDS transmission format according to a rule, and inserting an L identification into four pixels transmitted earliest in the L image, while inserting a R identification into four pixels transmitted earliest in the R image, before outputting alternatively at a rate of the frame frequency of 2f1. Shown as FIG. 3, the output LVDS image signal may be recorded into a first 3D video signal. Then the first 3D video signal is processed following what described in the step S300.

Preferably, in a real implementation, the step S212 includes specifically:

S2121, converting a color space of the L image and R image into a YUV color space, and converting the pixels of the L image and R image into a plurality of pixels in YUV 4:2:2;

S2122, analyzing and classifying a luminance Y of the image signal in the YUV color space, before dividing into a low luminance area, a mid luminance area and a high luminance area according to a luminance value; the luminance value of the low luminance area is smaller than a first threshold, the luminance value of the mid luminance area is between the first threshold and a second threshold, the luminance value of the high luminance area is larger than the second threshold; while the first threshold is smaller than the second threshold;

S2123, adopting a method of luminance partition scaling to improve a contrast, executing a luminance compression to the images in the low luminance area, executing a luminance enhancement to the images in the mid luminance area, while keeping the luminance in the high luminance area unchanged;

S2124, improving a resolution through a method of hierarchical interpolation, adopting a plurality of different interpolation algorithm for different luminance areas, before converting a resolution of image into a fixed resolution, while the pixels of the L image and R image after conversion compose an M*N matrix.

Specifically, executing an image improvement to the L image and R image in the YUV color space includes following steps:

analyzing and classifying a luminance Y of the image signal in the YUV color space, which is divided into: a low luminance area (the luminance value is smaller than a first threshold Yd), a high luminance area (the luminance value is larger than a second threshold Yh), and a mid luminance area (the luminance value is between the first threshold Yd and the second threshold Yh). Wherein, the first threshold Yd is smaller than the second threshold Yh, and both may be set according to a real requirement.

Then, adopting a luminance partition scaling to improve a contrast, executing a luminance compression to the images in the low luminance area, that is, a luminance value Pd of the pixels in the low luminance area (Pd is a luminance value of the pixels in the low luminance area) becomes into Pd*Cd, Cd is a variable and no larger than 1; executing a luminance enhancement to the images in the mid luminance area, that is, a luminance value Pz of the pixels in the mid luminance area (Pz is a luminance value of the pixels in the mid luminance area) becomes into Pz*Cz, Cz is a variable and no smaller than 1, also the Pz*Cz is no larger than a threshold value Yh of the high luminance area. While the luminance value in the high luminance area is kept unchanged.

Due to reducing the luminance in the low luminance area, and increasing the luminance in the mid luminance area, a contrast is improved, while keeping the luminance in the high luminance area unchanged, that ensures the image no distortion.

Then, improving the resolution through a hierarchical interpolation, that is, adopting a plurality of different interpolation algorithms for different luminance areas, before converting the resolution of image into a fixed resolution, while the pixels of the L image and R image after conversion compose an M*N matrix. Specifically:

for the low luminance area and high luminance area, a four-point average algorithm is adopted to make the interpolation, that is: supposing four adjacent pixels around the pixel Px to be interpolated are Pa (Ya, Ua, Va), Pb (Yb, Ub, Vb), Pm(Ym, Um, Vm), Pn (Yn, Un, Vn), respectively, then the pixel Px for interpolation is (Yx, Ux, Vx), wherein, Yx=(Ya+Yb+Ym+Yn)/4, Ux=(Ua+Ub+Um+Un)/4, Vx=(Va+Vb+Vm+Vn)/4. Wherein, each of the Y, U, V represents a component value of the four pixels in the YUV color space, which is an existing technology, and may be easily understood by a common technical personnel in the present area, thus no more details are described here.

While a close correlation algorithm for interpolation is adopted for the mid luminance area, that is, four adjacent pixels around the pixel Px to be interpolated are Pa (Ya, Ua, Va), Pb (Yb, Ub, Vb), Pm(Ym, Um, Vm), Pn (Yn, Un, Vn), respectively, then the pixel Px for interpolation is (Yx, Ux, Vx).

Wherein, a calculation process for each of the Yx, Ux, Vx is as follows: taking the Yx value for example,
1) Calculating an average luminance value Ye of the four adjacent pixels first, Ye=(Ya+Yb+Ym+Yn)/4;
2) Calculating respectively a variance Wa, Wb, Wm, Wn between the Ya, Yb, Ym, Yn and the Ye, and a variance sum of W=Wa+Wb+Wm+Wn; wherein, each of the Wa, Wb, Wm and Wn represents a corresponding variance between the Ya, Yb, Ym, Yn and the Ye;
3) Calculating a weight coefficient Ka=1−Wa/W, Kb=1−Wb/W, Km=1−Wm/W, Kn=1−Wn/W;
4) Yx=KaYa+KbYb+KmYm+KnYn. The calculation processes of the Ux and Vx are the same with that of the Yx, thus no more details are described here.

In the step S300, obtaining a depth information of an object in the L image and R image, and estimating a depth information of each pixel, before forming a corresponding figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the mages with a plurality of R viewpoints;

Specifically, referencing to FIG. 2, the step S300 includes specifically: S310, executing an unweaving and image separating to the image signals in the LVDS signal format, before separating into an L images sequence and a R images sequence; obtaining a depth information of an object in the L images sequence and R images sequence, and estimating the depth information of each pixel, before forming a continuous and smooth figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the images with a plurality of R viewpoints; obtaining a corresponding image signal in a VBO (V-By-One) signal format after interweaving the format of the composite image.

In a real implementation, executing an unweaving and L/R image separating process to the image signals in the LVDS signal format (that is, the first 3D video signal), before separating into the L images and R images; processing the L image and R image, and obtaining a depth information of an object in the image, and estimating the depth information of each pixel, before forming a continuous and smooth figure of depth; adopting a method of interpolating the viewpoints or extending the viewpoints, estimating an image with a plurality of L viewpoints according to the L image and the corresponding figure of depth, and estimating an image with a plurality of R viewpoints according to the R image and the corresponding figure of depth, forming an image with a plurality of viewpoints; according to an arrangement condition of the physical pixels of the ultra high definition naked-eye 3D screen, forming a composite image including a plurality of viewpoints information after a procession of interweaving the images with a plurality of viewpoints, which has a pixel number of H*V, wherein, a value of the H/M is an integer, a value of the V/N is an integer. As well as further executing a format interweavement to the composite image comprising a plurality of viewpoint information, and interweaving into a corresponding image signal in the VBO (V-by-one, a existing technology term) signal format, before outputting at a rate of a frequency of f2.

Preferably, the step S310 includes specifically:
S311, converting the image signal in the LVDS signal format into a RGB image signal, before separating the L image and R image;
S312, obtaining a similar object in the L image and R image, based on a horizontal displacement of the similar object in the L image and R image, calculating the parallax of the similar object in the L image and R image; executing a procession according to a color, texture and light/shadow information of the object in the L image and R image, before estimating the depth information of each pixel, and a continuous and smooth figure of depth is then formed;

S313, adopting a method of interpolating the viewpoints or extending the viewpoints, estimating an image with a plurality of L viewpoints according to the L image and the corresponding figure of depth, and estimating an image with a plurality of R viewpoints according to the R image and the corresponding figure of depth;

S314, forming a composite image including a plurality of viewpoints information after a procession of interweaving the images with a plurality of L viewpoints and the images with a plurality of R viewpoints, according to an arrangement condition of the physical pixels of the naked-eye 3D displayer;

S315, executing a format interweavement to the composite image comprising a plurality of viewpoint information, and interweaving into a corresponding image signal in the VBO signal format, before outputting at a rate of a frequency of f2, the f2 is a positive integer.

Figure 4:
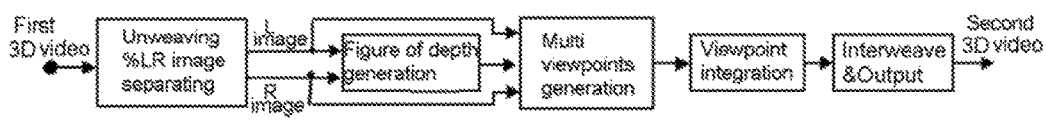
FIG. 4 illustrates a flowchart on a method of a step S310 in the second embodiment on the naked-eye 3D display method as provided in the present invention.

Referencing to FIG. 4, which is a flowchart on a method of the step S310 in the second embodiment on the naked-eye 3D display method as provided in the present invention. In a real implementation, executing an unweaving and an L/R image separation first: receiving an image signal in the LVDS signal format, and converting the signal in the LVDS transmission format into the RGB image signal, obtaining the L identification or R identification in the process, separating the L image through the L identification, and separating the R image through the R identification.

Followed by generating the figure of depth: obtaining a similar object in the L image and R image, based on a horizontal displacement of the similar object in the L image and R image, calculating the depth (or called: parallax) of the similar object in the L image and R image; executing a procession according to a color, texture and light/shadow information of the objects in the L image and R image, before estimating the depth information of each pixel, and a continuous and smooth figure of depth is further formed.

Then generating the plurality of viewpoints: the generation of the plurality of viewpoints may adopt a method of interpolating the viewpoints or extending the viewpoints. The viewpoints interpolation method is: taking the L image as the L viewpoint on the most left, and estimating an image with a plurality of L viewpoints according to the L image and the corresponding figure of depth; taking the R image as the R viewpoint on the most right, and estimating an image with a plurality of R viewpoints according to the R image and the corresponding figure of depth. The viewpoints extension method is: taking the L image and R image as a pair of viewpoints at the most middle, and estimating an image with a plurality of L viewpoints according to the L image and the corresponding figure of depth, by extending to both left and right directions, estimating an image with a plurality of R viewpoints according to the R image and the corresponding figure of depth, by extending to both left and right directions.

Followed by integrating the viewpoints: according to an arrangement condition of the physical pixels of the ultra-high definition naked-eye 3D displayer, interweaving the images with a plurality of viewpoints and integrating into an image; the image after processed by viewpoints integration comprises a plurality of viewpoints information, a number of the pixels of the integrated image is H*V, wherein, a value of H/M is an integer, a value of V/N is an integer.

Followed by an interweaving and outputting, executing a format interweave to the composite image comprising a plurality of viewpoint information, and interweaving into a corresponding image signal in the VBO (V-by-one) signal format, before outputting at a rate of a frequency of f2. Shown as FIG. 4, recording the output VBO signal format into a second 3D video signal, and the step S400 is reprocessing the second 3D video signal.

In the step S400, executing a frame interpolation, frequency doubling and image calibration for the composite image, before transmitting to a naked-eye 3D displayer, to achieve a naked-eye 3D display. Specifically, referencing to FIG. 2, the step S400 includes: S410, unweaving the image signals in the VBO signal format and obtaining a composite image comprising a plurality of viewpoints; executing a frame interpolation, frequency doubling and image calibration for the composite image, before interweaving the calibrated composite image into an according figure signal in the VBO signal format, and sending to a naked-eye 3D displayer, to achieve a naked-eye 3D display.

In a real implementation, executing a process of unweaving the image signal in the VBO signal format (that is, the second 3D video signal), and obtaining the composite image comprising a plurality of viewpoints; executing a procession of frame interpolating and frequency doubling, converting a frame of image into T frames of the same image after repeating, and obtaining a composite image with a frequency of Tf2; executing an image calibration to the composite image, including a Gamma calibration, a signal magnitude calibration and more; and further interweaving the calibrated composite image into the VBO signal format, and transmitting to the ultra-high definition naked-eye 3D displayer at a rate of a frequency of Tf2, to realize a high definition naked-eye 3D display. Wherein, the T is larger than 1, and is a positive integer.

Preferably, the step S410 includes:

S411, unweaving the image signals in the VBO signal format, before converting into a plurality of composite images in the RGB signal format;

S412, executing a process of frame interpolating and frequency doubling, converting a frame of image into T frames of the same image after repeating, and obtaining a composite image with a frequency of Tf2, wherein, the T is larger than 1;

S413, executing an image calibration to the composite image, according to an electric character and a requirement of a display effect of the naked-eye 3D displayer;

S414, interweaving the calibrated composite image into an according figure signal in the VBO signal format, and transmitting to the naked-eye 3D displayer at a rate of a frequency of Tf2, to realize a naked-eye 3D display. The above described steps are a refining to the steps of S400 and S410.

Figure 5:
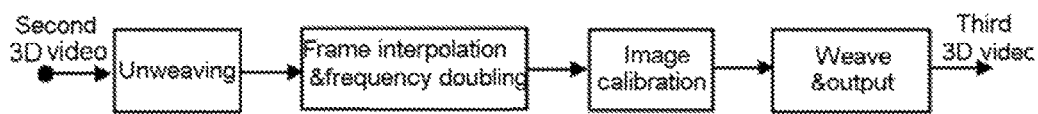
FIG. 5 illustrates a flowchart on a method of a step S410 in the second embodiment on the naked-eye 3D display method as provided in the present invention.

Referencing to FIG. 5, which is a flowchart on a method of a step S410 in the second embodiment on the naked-eye 3D display method as provided in the present invention. In the real implementation, executing a unweaving first: receiving the second 3D video signal, converting the composite image with the signal in the VBO transmission format into the RGB signal format. Followed by the frame interpolation and frequency doubling: executing a procession of the frame interpolation and frequency doubling, before converting a frame of image into T frames of the same image after repeating, and obtaining a composite image with a frequency of Tf2 (T is larger than 1). Then executing the image calibration: according to an electric character of the ultra-high definition naked-eye 3D displayer and a requirement of a display effect, executing a plurality of image calibrations to the composite image, including the Gamma calibration, the signal magnitude calibration and more. Finally, executing an interweaving and outputting: interweaving the calibrated composite image into the VBO signal format, and transmitting to the ultra-high definition naked-eye 3D screen at a rate of the frequency of Tf2, to achieve an ultra-high definition naked-eye 3D display. As shown in FIG. 5, the interweaved and output image signal in the VBO signal format in the step S400 may be recorded as a third 3D video signal. A naked-eye 3D displayer (such as an ultra-high definition naked-eye 3D screen) receives the output composite image comprising a plurality of viewpoints information in a VBO signal format in the step S400, before achieving an ultra-high definition naked-eye 3D display.

It should be noted that, the present invention may achieve the naked-eye 3D display by adopting the method and process described in FIG. 1 only, while the method and process shown in FIG. 2 is a further description to that of the FIG. 1, that is, the second embodiment is a further detailed description to the first embodiment. A limitation to a plurality of specific signal formats of an image signal including an LVDS signal format and a VBO signal format, is for a convenience of the transmission and receiving of the image data, ordinary technical personnel in this field can adopt a plurality of image signals in other formats to transmit the image data, after studying the present invention, so as to achieve a purpose of the present invention, thus all of these transforms should belong to the scope of protection in the appended claims of the present invention.

The present invention provides a naked-eye 3D display method, after executing a plurality of processes including the image improvement and frame interpolation to the left and right eye images output from the 3D signal source device, interweaving the left and right images and their recognition signals into the LVDS signal; obtaining the signal of depth, and adopting a method of interpolating the viewpoints or extending the viewpoints, generating a plurality of left-eye-viewpoints according to the left-eye-image and the depth information, and generating a plurality of right-eye-viewpoints according to the right-eye-image and the depth information, before interweaving the plurality of left and right viewpoints into the VBO signal; after executing a plurality of processes including frame interpolation and frequency doubling to the VBO signal, outputting the signal in the same VBO format to the ultra-high definition naked-eye 3D screen, and driving the ultra-high definition naked-eye 3D screen to achieve a high definition naked-eye 3D display, so as to achieving a naked-eye 3D viewpoints conversion effectively, and occupying a less resource, with a high definition 3D display, and a stable and smooth play, owning a low cost and a wide application.

Figure 6:
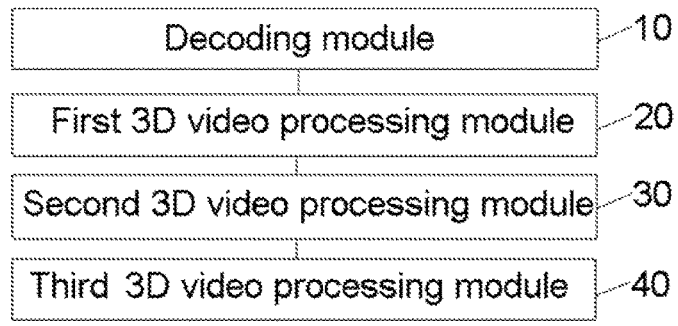
FIG. 6 illustrates a block diagram on a preferred embodiment of the naked-eye 3D display system as provided in the present invention.

Based on the above said naked-eye 3D display method, the present invention further provides a naked-eye 3D display system, as shown in FIG. 6, the system comprises:

a decoding module 10, applied to decoding a 3D signal and obtaining an original 3D video signal; details have been described in the step S100;

a first 3D video processing module 20, applied to executing a plurality of operations to the original 3D video signal, including: signal separating, image improving, classifying and frame interpolating, before obtaining a corresponding L image and R image; details have been described in the step S200;

a second 3D video processing module 30, applied to obtaining a depth information of an object in the L image and R image, and estimating a depth information of each pixel, before forming a corresponding figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the mages with a plurality of R viewpoints; details have been described in the step S300;

a third 3D video processing module 40, applied to executing a frame interpolation, frequency doubling and image calibration for the composite image, before transmitting to a naked-eye 3D displayer, to achieve a naked-eye 3D display; details have been described in the step S400.

Further, the first 3D video processing module 20 includes:

a first 3D video processing unit, applied to executing a signal separation to the original 3D video signal, before obtaining the corresponding L image signal and R image signal; executing a plurality of processes including image improving, classifying and frame interpolating to the L image signal and R image signal, before obtaining a corresponding L images sequence and a R images sequence; executing a format interweavement to the L images sequence and R images sequence, before obtaining a corresponding image signal in an LVDS signal format, details have been described in the step S210.

Further, the first 3D video processing unit comprises:

a signal separating unit, applied to executing a signal separation to the original 3D video signal, before converting an original 3D image signal into an L image signal, a R image signal, and an L/R synchronizing signal corresponding to the left image signal and the right image signal;

a color converting and image improving unit, applied to converting a color space of the L image and R image into a YUV color space, executing an image improvement to the L images and R images in the YUV color space through a luminance partition scaling and a hierarchical interpolation, before converting into an L image and a R image with pixels composing an M*N matrix; wherein, each of the M and N is a positive integer;

a classifying and frame interpolating unit, applied to classifying the L images and R images with the pixels of M*N under a control of the L/R synchronizing signal, before caching successively the L images together into an L image set, and caching successively the R images together into a R image set; executing the frame interpolation to the L image set and R image set respectively, before forming an L image set with a frame frequency f1 and a R image set with a frame frequency f1; outputting the images in the L image set and R image set successively, and outputting an according R identification signal and L identification signal; wherein, f1 is a positive integer;

a RGB image conversion unit, applied to executing a RGB image conversion to the L images and R images, converting the L image and R image in the YUV color space into an L image and R image in a RGB color space respectively;

a first interweaving and outputting unit, applied to arranging the pixels of the L images and R images in the RGB color space according to a law, interweaving a component of R, G, B in the pixels into an LVDS signal format according to a rule, and inserting an L identification into four pixels transmitted earliest in the L image, inserting a R identification into four pixels transmitted earliest in the R image, before outputting alternatively at a rate of the frame frequency of 2f1.

Further, the color conversion and image improving unit comprises:

a color conversion unit, applied to converting a color space of the L image and R image into a YUV color space, and converting the pixels of the L image and R image into a plurality of pixels of the YUV 4:2:2;

a luminance classification unit, applied to analyzing and classifying a luminance Y of the image signal in the YUV color space, before dividing into a low luminance area, a mid luminance area and a high luminance area according to a luminance value; the luminance value of the low luminance area is smaller than a first threshold, the luminance value of the mid luminance area is between the first threshold and a second threshold, the luminance value of the high luminance area is larger than the second threshold; while the first threshold is smaller than the second threshold;

a partition scaling unit, applied to adopting a method of luminance partition scaling to improve a contrast, executing a luminance compression to the images in the low luminance area, executing a luminance enhancement to the images in the mid luminance area, while keeping the luminance in the high luminance area unchanged;

a hierarchical interpolating unit, applied to improving a resolution through a method of hierarchical interpolation, adopting a plurality of different interpolation algorithm for different luminance areas, before converting a resolution of image into a fixed resolution, while the pixels of the L image and R image after conversion compose an M*N matrix.

Further, the second 3D video processing module 30 comprises:

a second 3D video processing unit, applied to unweaving and image separating the image signals in the LVDS signal format, before separating into an L images sequence and a R images sequence; obtaining a depth information of an object in the L images sequence and R images sequence, and estimating the depth information of each pixel, before forming a continuous and smooth figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the images with a plurality of R viewpoints; obtaining a corresponding image signal in a VBO signal format after interweaving the format of the composite image, details have been described in the step S310.

Further, the second 3D video processing unit comprises:

an unweaving and image separating unit, applied to converting the image signal in the LVDS signal format into a RGB image signal, before separating the L image and R image;

a figure of depth generating unit, applied to obtaining a similar object in the L image and R image, based on a horizontal displacement of the similar object in the L image and R image, calculating the parallax of the similar object in the L image and R image; executing a procession according to a color, texture and light/shadow information of the object in the L image and R image, before estimating the depth information of each pixel, and a continuous and smooth figure of depth is then formed;

a multi viewpoints generation unit, applied to adopting a method of interpolating the viewpoints or extending the viewpoints, estimating an image with a plurality of L viewpoints according to the L image and the figure of depth, and estimating an image with a plurality of R viewpoints according to the R image and the figure of depth;

a viewpoint integration unit, applied to forming a composite image including a plurality of viewpoints information after a procession of interweaving the images with a plurality of L viewpoints and the images with a plurality of R viewpoints, according to an arrangement condition of the physical pixels of the naked-eye 3D displayer;

a second interweaving and outputting unit, applied to executing a format interweavement to the composite image comprising a plurality of viewpoints information, and interweaving into a corresponding image signal in the VBO signal format, before outputting at a rate of a frequency of f2, the f2 is a positive integer.

Further, the third 3D video processing module 40 comprises:

an unweaving unit, applied to unweaving the image signals in the VBO signal format, before converting the image signal in the VBO signal format into a composite image in the RGB signal format;

a frame interpolating and frequency doubling unit, applied to executing a process of frame interpolating and frequency doubling to the composite image, converting a frame of image into T frames of the same image after repeating, and obtaining a composite image with a frequency of Tf2, wherein, the T is larger than 1;

an image calibration unit, applied to executing an image calibration to the composite image, according to an electric character of the naked-eye 3D displayer and a requirement of a display effect;

an interweaving and outputting and display unit, applied to interweaving the calibrated composite image into an according figure signal in the VBO signal format, and transmitting to the naked-eye 3D displayer at a rate of a frequency of Tf2, to achieve a naked-eye 3D display.

Further detailed descriptions to the present invention are stated below, referencing to an embodiment.

Supposing a 3D signal output from a 3D signal source device has a signal format of L/R 720P@24 Hz, a first 3D video signal is a signal of 1920×1080@120 Hz, a second 3D video signal is a signal of 3840×2160@30 Hz, a ultra-high definition screen is 3840×2160@60 Hz.

Figure 7:
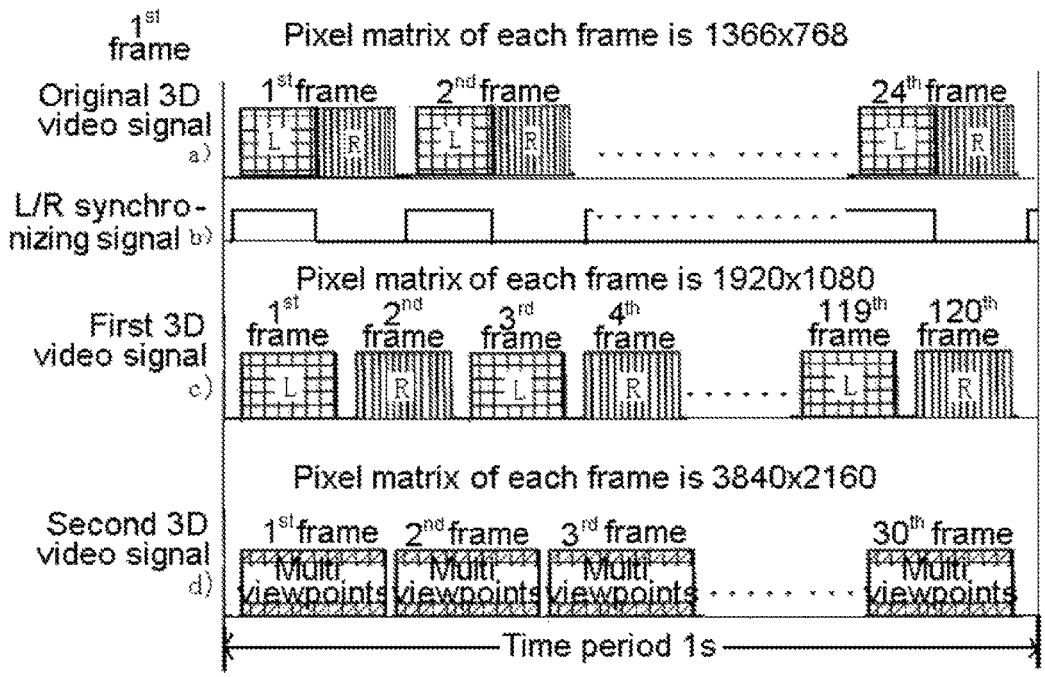
FIG. 7 illustrates a schematic diagram on a 3D video signal in an embodiment of the naked-eye 3D display system as provided in the present invention.

Referencing to FIG. 7, a 3D video signal of L/R 720P@24 Hz output from the 3D signal source device, after being processed by an interface circuit and a decoding module, outputs an original 3D video signal, as shown in a) in the FIG. 7: there are 24 frames in a unit time (1 s), a pixel resolution of the video frame is 1366×768, and each frame is a composite image by an L image and a R image, the pixel resolution of the L image and R image is 683×768.

A first 3D video processing module obtains an independent L image and R image from the original 3D video signal respectively, whose pixel resolution is 683×768, executing a color conversion, a luminance partition scaling and a hierarchical interpolation to the L and R image signals respectively, before converting into an L image and R image with the pixel resolution of 1920×1080; and generating an L/R synchronizing signal according to the original 3D video signal, as shown in b) in the FIG. 7: when the synchronizing signal is at a high voltage, it is the L image, while the synchronizing signal is at a low voltage, it is the R image.

Executing a further classification and frame interpolation: when the L/R synchronizing signal is at a high voltage, it is the L image, which is buffered together and forms an L image set, while the synchronizing signal is at a low voltage, it is the R image, which is buffered together and forms a R image set, during a unit time period (1 s), the L image set comprises 24 L images, the R image set comprises 24 R images; taking the L images in the L image set as a reference to interpolate frames, before making a number of the L images equal to 60 in the L image set during a unit time period, and similarly, making a number of the R images equal to 60 in the R image set during a unit time period; and generating a synchronizing signal with a frequency of 60 Hz, shown as c) in the FIG. 7; under a control of the synchronizing signal, it outputs alternatively the images in the L image set and R image set in turn, that is, when the synchronizing signal is at a high voltage, it outputs the L image, and when the synchronizing signal is at a low voltage, it outputs the R image, before forming a first 3D video signal with a frame frequency of 120 Hz, shown as c) in the FIG. 7, wherein, the frame frequency of the L image and R image is 60 Hz.

And, the first 3D video processing module executes a RGB image conversion to the 120 Hz sequence frame before interweaving into an LVDS commission format, and inserting an L identification into four pixels transmitted earliest in the L image, inserting a R identification into four pixels transmitted earliest in the R image, before outputting to the second 3D video processing module at a rate of the frame frequency of 120 Hz.

Figure 8:
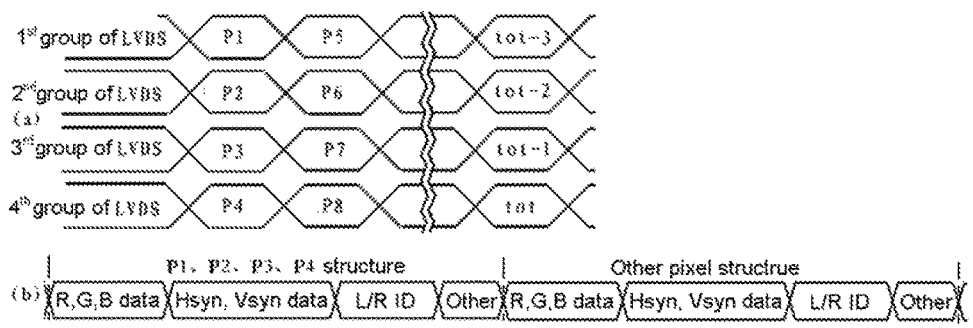
FIG. 8 illustrates a schematic diagram on an LVDS signal format in an embodiment of the naked-eye 3D display system as provided in the present invention.

Referencing to FIG. 8, wherein, the first 3D video processing module adopts four groups of LVDS signal lines, and a weaved LVDS transmission signal is shown as (a) in the FIG. 8: the number of pixels of each frame is tot=1920× 1080, a first group of the LVDS signal lines transmit pixels P1, P5, . . . , Ptot-3, a second group of the LVDS signal lines transmit pixels P2, P6, . . . , Ptot-2, a third group of the LVDS signal lines transmit pixels P3, P7, . . . , Ptot-1, a fourth group of the LVDS signal lines transmit pixels P4, P8, . . . , Ptot; a pixel structure for transmission is shown as (b) in the FIG. 8: the most earliest transmitted four pixels P1, P2, P3, P4 comprise a RGB image data, an Hsyn and Vsyn synchronizing data, an L/R identification and other data, while other pixels have no the L/R identification.

The second 3D video processing module receives the first 3D video signal before processing it, separating the L image and R image through the L/R identification, obtaining the parallax between the L image and R image, and further estimating the depth information between each pixel, and forming a continuous and smooth figure of depth. And it adopts a method of interpolating the viewpoints or extending the viewpoints, estimating an image with a plurality of L viewpoints according to the L image and the figure of depth, and estimating an image with a plurality of R viewpoints according to the R image and the figure of depth, forming an image with a plurality of viewpoints. According to an arrangement condition of the physical pixels of the ultra-high definition naked-eye 3D screen, executing an interweaving process to the image with a plurality of viewpoints and forming a composite image comprising a plurality of viewpoints information, whose pixel number is 3840×2160; and further executing a format interweavement to the composite image comprising a plurality of viewpoints information, before interweaving into a VBO signal format, and transmitting to the third 3D video processing module at a rate of a frequency of 30 Hz (shown as d) in the FIG. 7).

Figure 9:
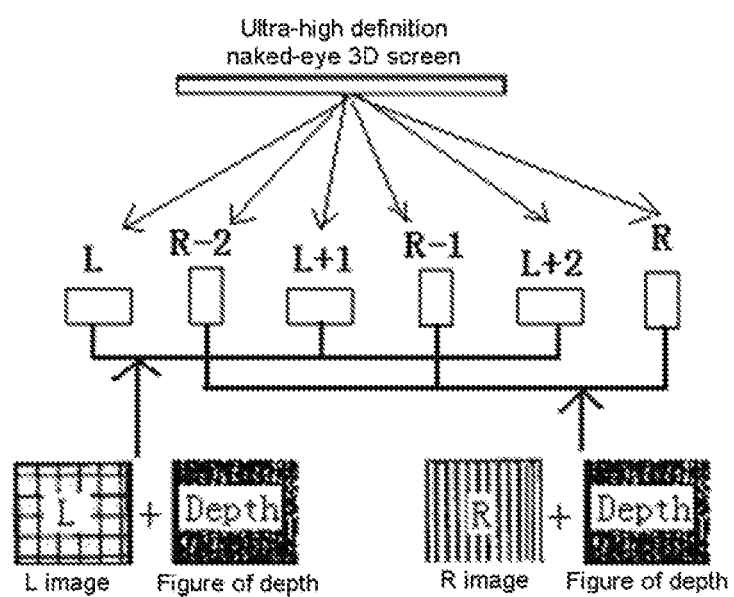
FIG. 9 illustrates a schematic diagram on the naked-eye 3D display in an embodiment of the naked-eye 3D display system as provided in the present invention.

Take a viewpoint interpolation of 6 viewpoints as an example, the image with a plurality of viewpoints is shown as FIG. 9: an L image is the L viewpoint at the most left, and an L+1 viewpoint and an L+2 viewpoint are interpolated by the L image together with the figure of depth; in a same method, a R image is the R viewpoint at the most right, and a R−1 viewpoint and a R−2 viewpoint are interpolated by the R image together with the figure of depth; the 6 viewpoints are interweaving into a composite image of 3840×2160, following an arrangement of the physical pixels of the ultra-high definition naked-eye 3D screen, and transmitted to the third 3D video processing module at a rate of a frequency of 30 Hz; the third 3D video processing module executes a plurality of processes including frame interpolation and frequency doubling, and drives the ultra-high definition naked-eye 3D screen at a rate of the conversion frequency of 60 Hz; the ultra-high definition naked-eye 3D screen projects light, before forming the viewpoint images of L, R−2, L+1, R−1, L+2, R, arranged in order, as shown in FIG. 9, and a high definition naked-eye 3D display is achieved.

The present invention provides a naked-eye 3D system, the first 3D video processing module executes a plurality of processes including the image improvement and frame interpolation to the left and right eye images output from the 3D signal source device, before interweaving the left and right images and their recognition signals into the LVDS signal and transmitting together to the second 3D video processing module; the second 3D video processing module obtains the signal of depth, by adopting a method of interpolating the viewpoints or extending the viewpoints, generates a plurality of left-eye-viewpoints according to the left-eye-image and the depth information, and generates a plurality of right-eye-viewpoints according to the right-eye-image and the depth information, before interweaving the plurality of left and right viewpoints into the VBO signal and transmitting to the third 3D video processing module; the third 3D video processing module executes a plurality of processes including frame interpolation and frequency doubling, before outputting the signal in the same VBO format to the ultra-high definition naked-eye 3D screen, and driving the ultra-high definition naked-eye 3D screen to achieve a high definition naked-eye 3D display. The present invention may achieve a naked-eye 3D viewpoints conversion effectively, and occupying a less resource, with a high definition 3D display, and a stable and smooth play, owning a low cost and a wide application.

The present invention executes an image improvement through adopting a luminance partition scaling and a hierarchical interpolation, executing a high efficiency image procession under a condition of saving the naked-eye 3D TV resources, and improving the image definition of the naked-eye 3D display. Interweaving the L/R synchronizing maker and the L/R image signal together into an LVDS signal for transmission, it saves a connection cable and an I/O interface of a CPU, thus saves the resources. The present invention forms the figure of depth through obtaining the parallax of the L/R images, followed by estimating the depth information of each pixel and forming a figure of depth; by adopting a method of interpolating viewpoints or extending viewpoints, it forms a plurality of L viewpoints through the L image together with the figure of depth, and forms a plurality of R viewpoints through the R image together with the figure of depth. The present invention adopts an ultra-high definition naked-eye 3D screen, and achieves a high definition naked-eye 3D display.

All above, the present invention provides a naked-eye 3D display method and system thereof, through executing signal separation, image improvement, classifying and frame interpolation to the original 3D video signal, before obtaining the according L image and R image; obtaining the depth information of the objects in the L image and R image and estimating the depth information of each pixel, and forming a corresponding figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the images with a plurality of R viewpoints; executing frame interpolation, frequency doubling and image calibration to the composite images, before transmitting to the naked-eye 3D displayer, to achieve the naked-eye 3D display; it has achieved the viewpoints conversion for naked-eye 3D effectively, taking up less resources, having a high definition 3D display, which is stable and fluency, it has a low cost, a wide application, and has brought a great convenience.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A naked-eye 3D display method, wherein, comprising:
   S1: decoding a 3D signal and obtaining an original 3D video signal;
   S2: executing a plurality of operations to the original 3D video signal, including: signal separating, image improving, classifying and frame interpolating, before obtaining a corresponding left (L) image and right (R) image;
   S3: obtaining a depth information of an object in the L image and R image, and estimating a depth information of each pixel, before forming a corresponding figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the images with a plurality of R viewpoints;
   S4: executing a frame interpolation, frequency doubling and image calibration for the composite image, before transmitting to a naked-eye 3D displayer, to achieve a naked-eye 3D display;
   wherein the step S2 comprises:
   S21, executing a signal separation to the original 3D video signal, before obtaining a corresponding L image signal and a R image signal; executing a plurality of processes including image improving, classifying and frame interpolating to the L image signal and R image signal, before obtaining a corresponding L images sequence and a R images sequence; executing a format interweavement to the L images sequence and R images sequence, before obtaining a corresponding image signal in an LVDS signal format;
   wherein the step S21 comprises:
   S211, executing a signal separation to the original 3D video signal, before converting an original 3D image signal into an L image signal, a R image signal, and an L/R synchronizing signal corresponding to the L image signal and the R image signal;
   S212, converting a color space of the L image and R image into a YUV color space, executing an image improvement to the L images and R images in the YUV color space through a luminance partition scaling and a hierarchical interpolation, before converting into an L image and a R image with pixels composing an M*N matrix; wherein, each of the M and N is a positive integer;
   S213, classifying the L images and R images with the pixels of M*N, under a control of the L/R synchronizing signal, before caching successively the L images together into an L image set, and caching successively the R images together into a R image set; executing the frame interpolation to the L image set and R image set respectively, before forming an L image set with a frame frequency f1 and a R image set with a frame frequency f1; outputting the images in the L image set and R image set successively, and outputting an according R identification signal and L identification signal; wherein, f1 is a positive integer;
   S214, executing a RGB image conversion to the L image and R image, converting the L image and R image in the YUV color space into an L image and R image in a RGB color space respectively;
   S215, arranging the pixels of the L images and R images in the RGB color space according to a law, interweaving each component of R, G, B in each pixel into an LVDS signal format according to a rule, and inserting an L identification into four pixels transmitted earliest in the L image, inserting a R identification into four pixels transmitted earliest in the R image, before outputting alternatively at a rate of frame frequency 2f1.

2. The naked-eye 3D display method according to claim 1, wherein, the step S212 includes specifically:
   S2121, converting a color space of the L image and R image into a YUV color space, and converting the pixels of the L image and R image into a plurality of pixels in YUV 4:2:2;
   S2122, analyzing and classifying a luminance Y of the image signal in the YUV color space, before dividing into a low luminance area, a mid luminance area and a high luminance area according to a luminance value; the luminance value of the low luminance area is smaller than a first threshold, the luminance value of the mid luminance area is between the first threshold and a second threshold, the luminance value of the high luminance area is larger than the second threshold; while the first threshold is smaller than the second threshold;
   S2123, adopting a method of luminance partition scaling to improve a contrast, executing a luminance compression to the images in the low luminance area, executing a luminance enhancement to the images in the mid luminance area, while keeping the luminance in the high luminance area unchanged;
   S2124, improving a resolution through a method of hierarchical interpolation, adopting a plurality of different interpolation algorithms for different luminance areas, before converting a resolution of image into a fixed resolution, while the pixels of the L image and R image after conversion compose an M*N matrix.

3. The naked-eye 3D display method according to claim 1, wherein, the step S3 includes specifically:
   S31, unweaving and image separating the image signals in the LVDS signal format, before separating into an L images sequence and a R images sequence; obtaining a depth information of an object in the L images sequence and R images sequence, and estimating the depth information of each pixel, before forming a continuous and smooth figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the images with a plurality of R viewpoints; obtaining a corresponding image signal in a VBO signal format after interweaving the format of the composite image.

4. The naked-eye display method according to claim 3, wherein, the step S31 includes specifically:

S311, converting the image signal in the LVDS signal format into a RGB image signal, before separating the L image and R image;

S312, obtaining a similar object in the L image and R image, based on a horizontal displacement of the similar object in the L image and R image, calculating the parallax of the similar object in the L image and R image; obtain an information of color, texture and light/shadow of the object in the L image and R image, before estimating the depth information of each pixel, and a continuous and smooth figure of depth is then formed;

S313, adopting a method of interpolating the viewpoints or extending the viewpoints, estimating an image with a plurality of L viewpoints according to the L image and the corresponding figure of depth, and estimating an image with a plurality of R viewpoints according to the R image and the corresponding figure of depth;

S314, forming a composite image including a plurality of viewpoints after a procession of interweaving the images with a plurality of L viewpoints and the images with a plurality of R viewpoints, according to an arrangement condition of the physical pixels of the naked-eye 3D screen;

S315, executing a format interweavement to the composite image comprising a plurality of viewpoint information, and interweaving into a corresponding image signal in the VBO signal format, before outputting at a rate of frequency f2, the f2 is a positive integer.

5. The naked-eye display method according to claim 4, wherein, the step S4 includes:

S41, unweaving the image signals in the VBO signal format, before converting the image signal in the VBO signal format into a composite image in the RGB signal format;

S42, executing a process of frame interpolating and frequency doubling to the composite image, converting a frame of image into T frames of the same image after repeating, and obtaining a composite image with a frequency of Tf2, wherein, the T is larger than 1;

S43, executing an image calibration to the composite image, according to an electrical characteristics of the naked-eye 3D displayer and a requirement of a display effect of the naked-eye 3D displayer;

S44, interweaving the calibrated composite image into an according figure signal in the VBO signal format, and transmitting to the naked-eye 3D displayer at a rate of frequency Tf2, to achieve a naked-eye 3D display.

6. A naked-eye 3D display system, wherein, comprising:
a memory; and
a processor coupled to the memory, wherein the processor is configured to:
decode a 3D signal and obtaining an original 3D video signal;
execute a plurality of operations to the original 3D video signal, including: signal separating, image improving, classifying and frame interpolating, before obtaining a corresponding L image and R image;
obtain a depth information of an object in the L image and R image, and estimating a depth information of each pixel, before forming a corresponding figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the mages with a plurality of R viewpoints;
execute a frame interpolation, frequency doubling and image calibration for the composite image, before transmitting to a naked-eye 3D displayer, to achieve a naked-eye 3D display;
wherein the step of execute a plurality of operations to the original 3D video signal, comprises:
executing a signal separation to the original 3D video signal, before obtaining a corresponding L image signal and a R image signal; executing a plurality of processes including image improving, classifying and frame interpolating to the L image signal and R image signal, before obtaining a corresponding L images sequence and a R images sequence; executing a format interweavement to the L images sequence and R images sequence, before obtaining a corresponding image signal in an LVDS signal format; comprises:
executing a signal separation to the original 3D video signal, before converting an original 3D image signal into an L image signal, a R image signal, and an L/R synchronizing signal corresponding to the L image signal and the R image signal;
converting a color space of the L image and R image into a YUV color space, executing an image improvement to the L images and R images in the YUV color space through a luminance partition scaling and a hierarchical interpolation, before converting into an L image and a R image with pixels composing an M*N matrix; wherein, each of the M and N is a positive integer;
classifying the L images and R images with the pixels of M*N, under a control of the L/R synchronizing signal, before caching successively the L images together into an L image set, and caching successively the R images together into a R image set; executing the frame interpolation to the L image set and R image set respectively, before forming an L image set with a frame frequency f1 and a R image set with a frame frequency f1; outputting the images in the L image set and R image set successively, and outputting an according R identification signal and L identification signal; wherein, f1 is a positive integer;
executing a RGB image conversion to the L images and R images, converting the L image and R image in the YUV color space into an L image and R image in a RGB color space respectively;
arranging the pixels of the L images and R images in the RGB color space according to a law, interweaving each component of R, G, B in each pixel into an LVDS signal format according to a rule, and inserting an L identification into four pixels transmitted earliest in the L image, inserting a R identification into four pixels transmitted earliest in the R image, before outputting alternatively at a rate of the frame frequency of 2f1.

7. The naked-eye 3D display system according to claim 6, wherein the processor is further configured to:
convert a color space of the L image and R image into a YUV color space, and converting the pixels of the L image and R image into a plurality of pixels in the YUV 4:2:2;
analyze and classify a luminance Y of the image signal in the YUV color space, before dividing into a low luminance area, a mid luminance area and a high luminance area according to a luminance value; the luminance value of the low luminance area is smaller than a first threshold, the luminance value of the mid luminance area is between the first threshold and a second threshold, the luminance value of the high luminance area is larger than the second threshold; while the first threshold is smaller than the second threshold;

adopt a method of luminance partition scaling to improve a contrast, executing a luminance compression to the images in the low luminance area, executing a luminance enhancement to the images in the mid luminance area, while keeping the luminance in the high luminance area unchanged;

improve a resolution through a method of hierarchical interpolation, adopting a plurality of different interpolation algorithms for different luminance areas, before converting a resolution of image into a fixed resolution, while the pixels of the L image and R image after conversion compose an M*N matrix.

8. The naked-eye 3D display system according to claim 6, wherein the processor is further configured to:

unweave and image separate the image signals in the LVDS signal format, before separating into an L images sequence and a R images sequence; obtaining a depth information of an object in the L images sequence and R images sequence, and estimating the depth information of each pixel, before forming a continuous and smooth figure of depth; estimating an image with a plurality of L viewpoints according to the L image and the corresponding figure of depth, and estimating an image with a plurality of R viewpoints according to the R image and the corresponding figure of depth; forming a composite image including a plurality of viewpoints after interweaving the images with a plurality of L viewpoints and the images with a plurality of R viewpoints; obtaining a corresponding image signal in a VBO signal format after interweaving the format of the composite image.

9. The naked-eye 3D display system according to claim 8, wherein the processor is further configured to:

convert the image signal in the LVDS signal format into a RGB image signal, before separating the L image and R image;

obtain a similar object in the L image and R image, based on a horizontal displacement of the similar object in the L image and R image, calculating the parallax of the similar object in the L image and R image; obtaining a color, texture and light/shadow information of the object in the L image and R image, before estimating the depth information of each pixel, and a continuous and smooth figure of depth is then formed;

adopt a method of interpolating the viewpoints or extending the viewpoints, estimating an image with a plurality of L viewpoints according to the L image and the corresponding figure of depth, and estimating an image with a plurality of R viewpoints according to the R image and the corresponding figure of depth;

form a composite image including a plurality of viewpoints information after a procession of interweaving the images with a plurality of L viewpoints and the images with a plurality of R viewpoints, according to an arrangement condition of the physical pixels of the naked-eye 3D displayer;

execute a format interweavement to the composite image comprising a plurality of viewpoint information, and interweaving into a corresponding image signal in the VBO signal format, before outputting at a rate of frequency f2, the f2 is a positive integer.

10. The naked-eye 3D display system according to claim 9, wherein the processor is further configured to:

unweave the image signals in the VBO signal format, before converting the image signal in the VBO signal format into a composite image in the RGB signal format;

execute a process of frame interpolating and frequency doubling to the composite image, converting a frame of image into T frames of the same image after repeating, and obtaining a composite image with a frequency of Tf2, wherein, the T is larger than 1;

execute an image calibration to the composite image, according to an electrical characteristics of the naked-eye 3D displayer and a requirement of a display effect;

interweave the calibrated composite image into an according figure signal in the VBO signal format, and transmitting to the naked-eye 3D displayer at a rate of frequency Tf2, to achieve a naked-eye 3D display.

* * * * *